US00RE37235E

(19) United States
(12) Reissued Patent
Hauck et al.

(10) Patent Number: US RE37,235 E
(45) Date of Reissued Patent: Jun. 26, 2001

(54) SHORT LENGTH TAPERED EXTRUSION COOKING APPARATUS HAVING PERIPHERAL DIE

(75) Inventors: Bobbie W. Hauck; Marc Wenger, both of Sabetha, KS (US)

(73) Assignee: Wenger Manufacturing, Inc., Sabetha, KS (US)

(21) Appl. No.: 09/568,240

(22) Filed: May 9, 2000

Related U.S. Patent Documents

Reissue of:
(64) Patent No.: 6,016,742
Issued: Jan. 25, 2000
Appl. No.: 09/215,484
Filed: Dec. 18, 1998

(51) Int. Cl.[7] ..... A23J 1/00; B29B 7/42
(52) U.S. Cl. ..... 9/348; 99/353; 425/382 R; 425/464; 426/516
(58) Field of Search ..... 99/348, 353, 443 C, 99/451; 425/382 R, 464, 313, 311, 310, 382.2; 426/506, 516, 272, 448, 805

(56) References Cited

U.S. PATENT DOCUMENTS 3,295,469 * 1/1967 Vassalli ..... 425/313 X
5,641,522 * 6/1997 Satanovsky ..... 425/313 X
5,694,833 * 12/1997 Wenger ..... 99/348
5,700,510 * 12/1997 Hauck ..... 426/516
5,814,350 * 9/1998 Rockstedt ..... 425/313 X

FOREIGN PATENT DOCUMENTS

645835 * 2/1979 (SU) ..... 425/337
1242386 * 7/1986 (SU) ..... 425/382 R

* cited by examiner

*Primary Examiner*—Reginald L. Alexander
(74) *Attorney, Agent, or Firm*—Hovey, Williams, Timmons & Collins

(57) ABSTRACT

An improved short-length, high-speed extrusion device (10) is provided with having increased capacities and the capability of producing high quality extrudates with improved density and pellet integrity properties. The device (10) includes an extruder (14) equipped with a peripheral die (20,118), the latter having die outlet openings (100,120) oriented generally transverse to the longitudinal axis of the extruder barrel (16). The die (20) has a plurality of axially spaced series (92–98) of openings (100), wherein each series (92–98) has a different number of openings (100). Alternately, the die (118) is of radially enlarged design relative to the extruder barrel (16) and has only a single series of openings (120). In both instances, an internal flow-directing bullet (108,140) is positioned within the corresponding die (20,118) in order to smoothly direct flow of product from the outlet (21) of the barrel (16) to the transversely oriented die outlet openings (100,120).

17 Claims, 3 Drawing Sheets

SHORT LENGTH TAPERED EXTRUSION COOKING APPARATUS HAVING PERIPHERAL DIE

Matter enclosed in heavy brackets [ ] appears in the original patent but forms no part of this reissue specification; matter printed in italics indicates the additions made by reissue.

BACKGROUND OF THE INVENTION

1. Field of the Invention

The present is broadly concerned with improved short length, high speed extrusion cooking devices of the type generally described in U.S. Pat. No. 5,694,833 equipped with peripheral dies allowing greater product throughputs while increasing product densities, cook values and moisture levels. More particularly, the invention pertains to such improved extrusion cookers, and corresponding methods, wherein a peripheral extrusion die is disposed across the extruder barrel outlet and has a series of extrusion outlet openings oriented transverse to the longitudinal axis of the barrel. The peripheral dies of the invention may be provided with individual, axially spaced apart series of die outlet openings (usually with different numbers of outlet openings in each series), or more preferably with a radially enlarged peripheral die having only a single series of die openings.

2. Description of the Prior Art

U.S. Pat. No. 5,694,833 (incorporated by reference herein) describes a significant breakthrough in the extruder art. Specifically, that patent discloses relatively short length extruders (having an L/D ratio of up to about 6) which are operated at high screw rotational speeds typically in excess of 500 rpm. It has been found that extruders of this type are capable of producing, at relatively high output rates, feed products of very high integrity. Moreover, such extruders can be produced at lower costs as compared with conventional cooking extruders.

Extruders of this type are heretofore have been equipped with conventional plate-type face dies bolted across the outlet end of the extruder barrel. Dies of this variety have a series of die outlet openings which are essentially parallel with the longitudinal axis of the extruder barrel. Face dies, while in widespread use, tend to restrict extruder throughputs. Furthermore, because such dies must withstand considerable pressure, they are normally relatively expensive.

It has also been known in the past to equip certain long-barrel extruders with so-called "peripheral" dies. Dies of this character have die outlet openings oriented transverse to the longitudinal axis of the extruder barrel. Generally speaking, peripheral dies have a tendency to adversely affect product quality, particularly where relatively dense extrudates are desired. Accordingly, peripheral dies have not achieved wide spread use in the extrusion art.

SUMMARY OF THE INVENTION

The present invention provides improved extrusion devices of the short-barrel, high-speed variety through the use of peripheral die structures. Broadly speaking, extrusion devices of the invention include an elongated, tubular barrel having a material inlet and a spaced material outlet with an inner surface defining an elongated bore; an elongated, helically flighted screw assembly is positioned within the bore and is coupled to a drive for rotating the screw assembly at a rotational speed of at least about 500 rpm. A peripheral extrusion die is disposed across a material outlet of the barrel and has a series of extrusion outlet openings oriented transverse to longitudinal axis of the barrel. Normally, the extruder would have an L/D ratio as hereinafter defined of up to about 7.

In preferred forms of the invention, the extruder barrel has an internal bore of generally frustoconical configuration for at least about 50% of the length of the bore from the inlet to the outlet. Usually, the bore has a general frustoconical shape substantially its full length from the barrel inlet to the outlet so as to present a generally decreasing cross-section of area along the length of the bore. Although twin screw extruders can be used in the invention, generally the screw assemblies are of the single screw variety. In terms of screw rotational speed, the preferred levels are from about 600–1500 rpm.

One peripheral die assembly in accordance of the invention makes use of a plurality of series of extrusion outlet openings, with the respective series being axially spaced apart. In such a design, the number of outlet openings in each series is different, with the smallest number of openings in the series nearest the extruder barrel outlet. In another preferred design, the peripheral die is substantially radially enlarged as compared with the outlet end of the extruder barrel. This allows provision of a substantially greater number of die outlet openings, so that only a single series of such openings is needed to provide the requisite extruder throughput.

In order to achieve a smooth material flow transition from the extruder barrel outlet to the peripheral die openings, internal flow-directing structure is normally used with the peripheral dies of the invention. Such flow-directing structure cooperates with the other die components for evenly and smoothly directing material from the extruder barrel to the peripheral die outlet openings without undue buildup of pressure within the die.

DETAILED DESCRIPTION OF THE PREFERRED EMBODIMENT

Figure 7:
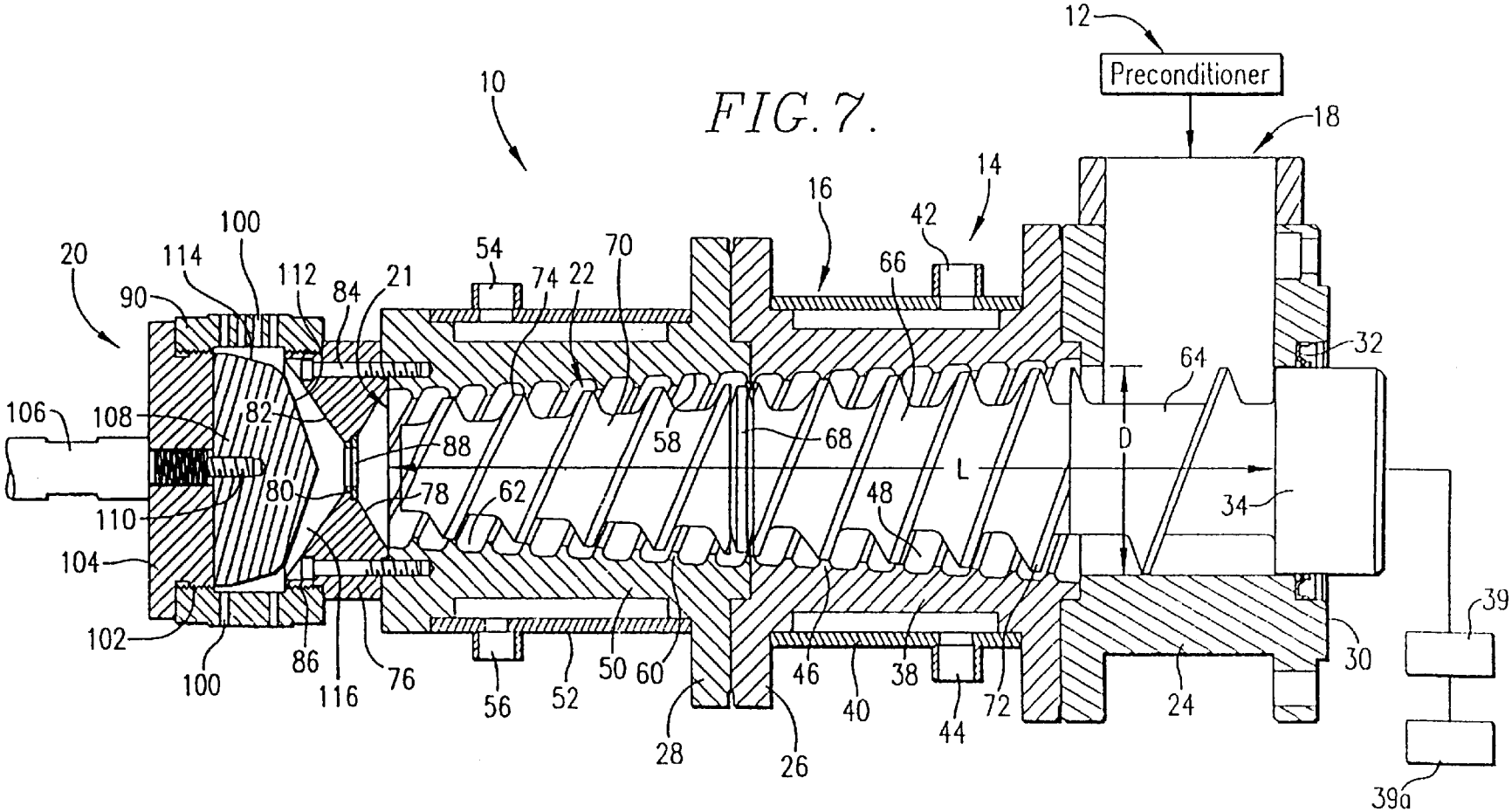
FIG. 7 is a vertical sectional view of a complete extrusion apparatus in accordance with the invention.

Turning now to the drawings, a short length extruder assembly 10 is illustrated in FIG. 7. Broadly speaking, the assembly 10 includes a preconditioner 12 and an extruder 14. The latter includes an elongated tubular barrel 16 having an inlet 18 and an endmost, apertured peripheral extrusion die 20 across the barrel outlet 21. An elongated, flighted, axially rotatable screw assembly 22 is disposed within barrel 16 along the length thereof.

In more detail, the preconditioner 12 is designed to initially moisturize and partially precook dry ingredients prior to passage thereof as a dough or the like into the inlet 18 of extruder 14. To this end, the preconditioner 12 is typically in the form of an elongated chamber equipped with rotatable internal paddles as well as injection ports for water and/or steam. A variety of preconditioners may be used in the context of the invention. However, it is particularly preferred to use Wenger DDC preconditioners of the type described in U.S. Pat. No. 4,752,139, incorporated by reference herein.

In the embodiment illustrated, the barrel 16 is made up of three axially aligned and interconnected tubular head sections, namely inlet head 24 and second and third sections 26, 28. The inlet bead 24 is configured to present the upwardly opening extruder inlet 18 and is positioned beneath the outlet of preconditioner 12 as shown. In addition, the inlet bead 24 has an apertured end wall 30 equipped with seals 32 for engaging seal block 34. The screw assembly 22 is mounted on hexagonal drive shaft 36 and is rotated via schematically depicted conventional bearing housing 39 and electric motor 39a.

The second head 26 includes a tubular metallic section 38 equipped with an external jacket 40. The latter has an inlet 42 and an outlet 44 so as to permit introduction of heating or cooling media (e.g., cold water or steam) into the jacket, thus allowing indirect temperature control for the head 26. The overall head 26 further presents an internal surface with helical ribbed sections 46 which defines an internally extending bore 48. As shown, the diameter of bore 48 decreases between inlet head 24 and third head 28.

Third head 28 is similar in many respects to bead 26 and includes a tubular section 50 and an outboard jacket 52, the latter equipped with an inlet 54 and outlet 56 for introduction of indirect cooling or heating media. The inner surface 58 of section 50 presents helical ribs 60 and defines an axially extending central bore 62. The bore 62 decreases in effective diameter between the end of barrel section 28 adjacent section 26 and the end of the section 28 proximal to die 20.

Although not shown in detail, it will be appreciated that the head sections 38 and 50 may be provided with removable internal sleeves if desired. This is particularly suitable for larger, high capacity machines where wear considerations are significant.

The screw assembly 22 includes four rotatable elements mounted on a central shaft and interconnected in an end-to-end relationship. In particular, assembly 22 has an inlet screw section 64, a first screw section 66, a rotatable spacer 68 and a third screw section 70.

The first screw section 66 includes an elongated central shaft presenting an outer, generally frustoconical surface and outwardly extending helical flighting 72. It will be seen that the overall configuration of the screw section 66 conforms with the decreasing diameter of bore 48, i.e., the outer periphery of the flighting 72 progressively decreases from the inlet end of the screw section 66 to the outlet end thereof adjacent spacer 68.

The spacer 68 is mounted on the central shaft between the screw sections 66,70. The spacer 68 presents a substantially flattened outer surface as shown, which is slightly inboard of the adjacent margins of the screw sections 66,68.

The third screw section 70 is very similar to screw section 66. That is, the section 70 includes an elongated central shaft presenting an outermost, frustoconical surface and helical fighting 74.

Again referring to FIG. 7, it will be observed that the overall extruder bore defined by the sections 38,50 is of generally frustoconical configuration leading from inlet 18 to die 20, i.e., the barrel bore presents a generally decreasing cross-sectional area along the length thereof. Moreover, it will be seen that the effective length of the extruder from the remote end of inlet 18 to the end of barrel 16 (shown as dimension "L" in FIG. 7) versus the maximum diameter of the barrel bore (dimension "D" in FIG. 7) is relatively low, and preferably up to about 7; the more preferred L/D ratio is up to about 6 and most preferably from about 3–6. As used herein, "L/D ratio" refers to the ratio measured in accordance with the exemplary length and diameter illustrated in FIG. 7.

It has been discovered that the short length extruders of the invention should be operated at the relatively high rotation speeds described above. Such high speed operation, in conjunction with the other preferred configuration details, gives high throughputs together with good quality of products.

A particular feature of the present invention involves the use of peripheral dies in conjunction with the short length of the extruders. One such peripheral die 20 is illustrated in FIGS. 1–4 and 7. In detail, the die 20 includes a first tubular section 76 presenting a converging, generally frustoconical input wall 78 terminating at a central, substantially circular flow-restricting opening 80. The section 76 also has a substantially frustoconical, diverging output wall 82 downstream of the opening 80. As shown, the section 76 is affixed to the butt end of the barrel 14 by means of screws 84. Further, the outer surface of section 76 remote from barrel 14 is threaded as at 86. In practice, an annular insert 88 is positioned within the opening 80.

The overall die 20 also includes an apertured, annular segment 90 which is threadably attached to the tubular section 76. The segment 90 is provided with four axially spaced apart, circumferentially spaced series 92–98 of extrusion outlet openings 100. In order to provide essentially even output from the respective outlet openings series 92–98, the number of outlet openings 100 in each series is different, i.e., the number of openings increases in each of the series 92–98, with the first series 92 containing the smallest number of openings 100 (see FIGS. 2–4). The outboard end of segment 90 is also threaded as at 102, and supports a complementally threaded cross plate 104. The latter in turn has an outwardly extending knife shaft 106 as illustrated.

Figure 1:
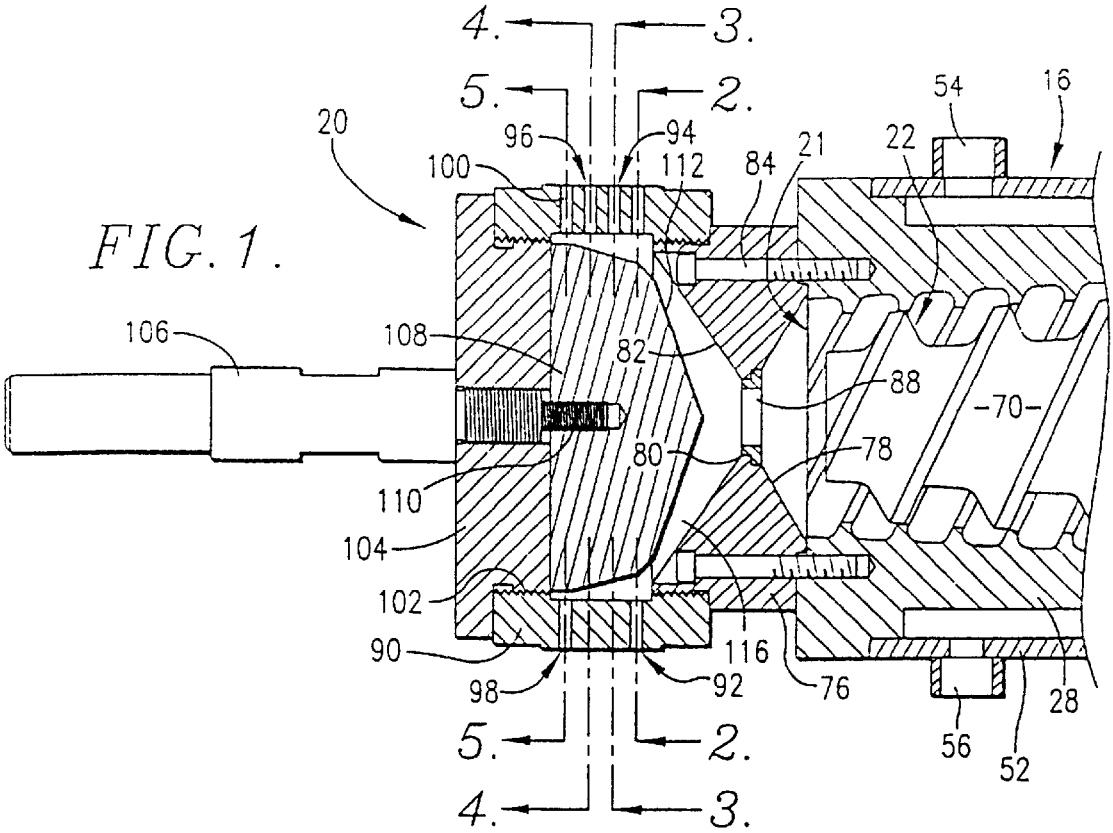
FIG. 1 is a fragmentary vertical sectional view illustrating a preferred peripheral die assembly mounted on a short length tapered extrusion cooking device.
Figure 3:
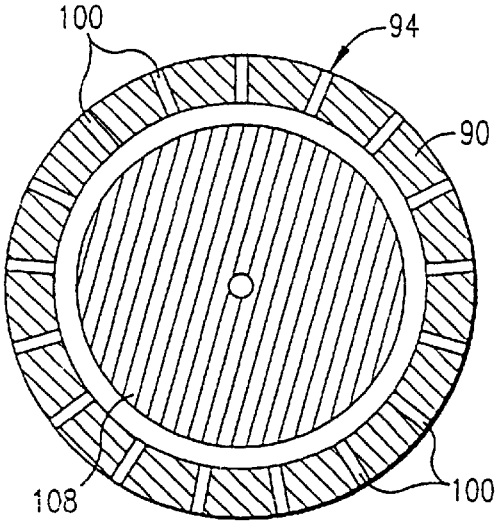
FIG. 3 is a vertical sectional view taken along line 3—3 of FIG. 1 and illustrating the second row of peripheral die openings provided in the peripheral die assembly.
Figure 2:
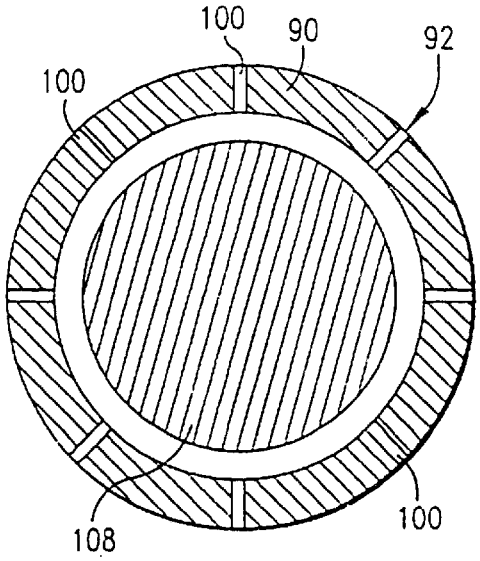
FIG. 2 is a vertical sectional view taken along line 2—2 of FIG. 1 and illustrating the initial row of peripheral die openings provided in the peripheral die assembly.
Figure 5:
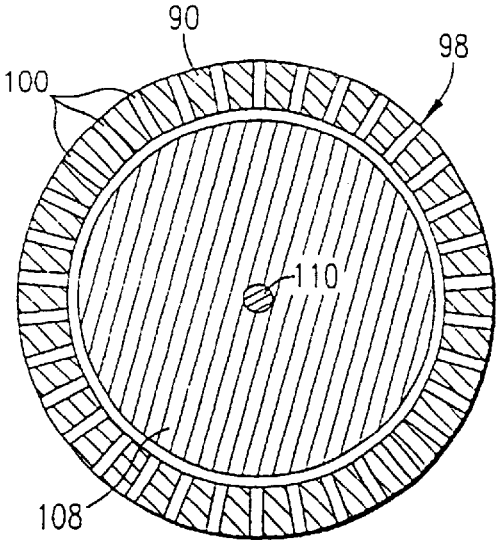
FIG. 5 is a vertical sectional view taken along line 5—5 of FIG. 1 and illustrating the fourth row of peripheral die openings provided in the peripheral die assembly.
Figure 4:
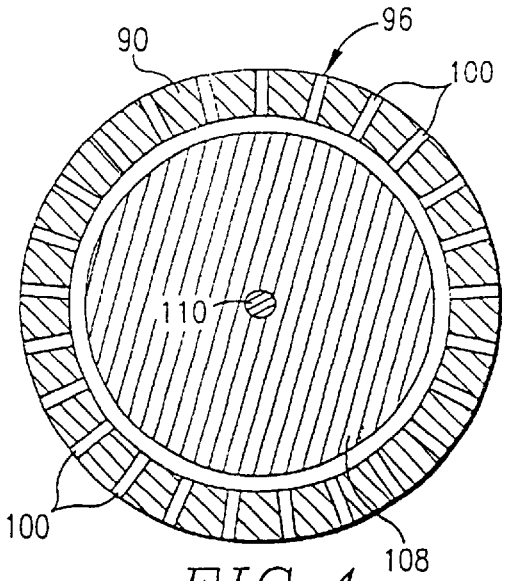
FIG. 4 is a vertical sectional view taken along line 4—4 of FIG. 1 and illustrating the third row of peripheral die openings provided in the peripheral die assembly.

An internal flow-directing bullet 108 is secured to the inner face of cross plate 104 by means of screw 110. The bullet 108 presents a central apex and a diverging, frustoconical surface 112 leading to an outwardly extending and diverging terminal surface 114. As illustrated in FIGS. 1 and 7, the spacing between the output wall 82 of section 76 and the surfaces 112,114 of the bullet 108 defines a flow path 116 serving to direct product from the extruder barrel 14 towards the openings 100.

Figure 6:
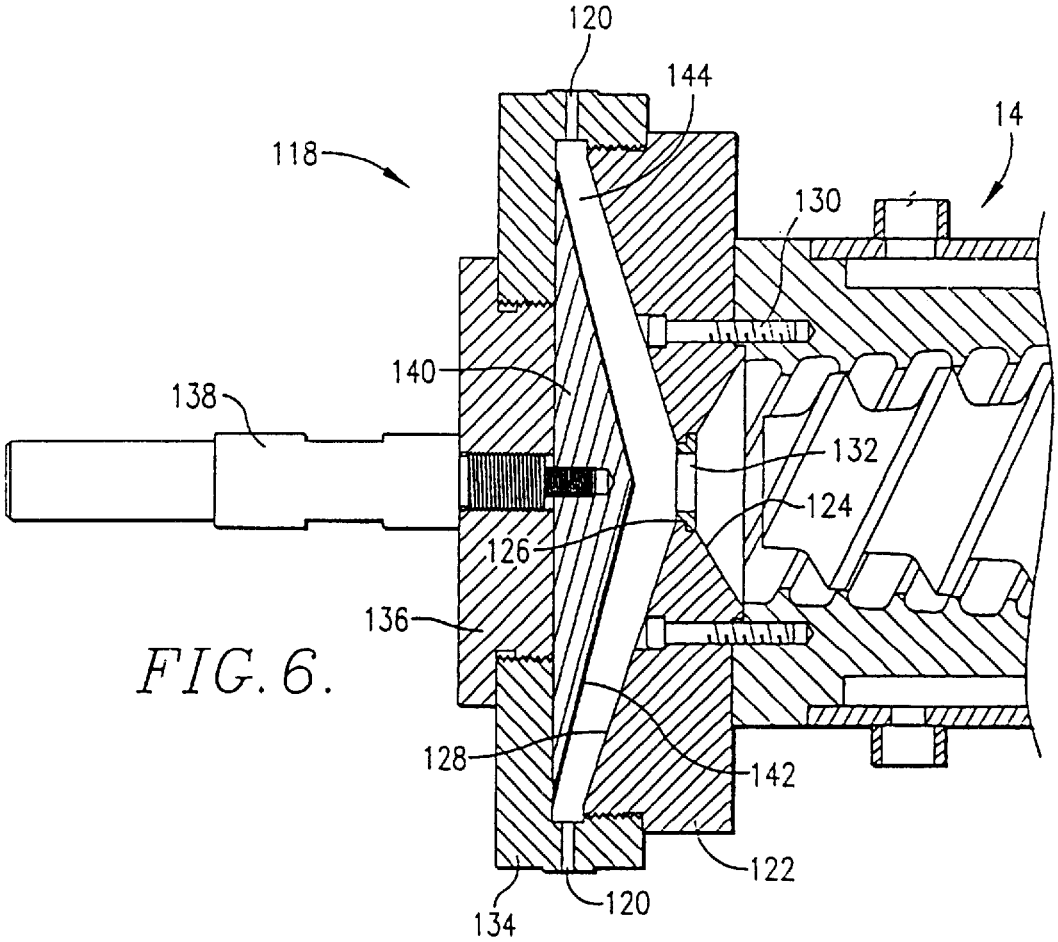
FIG. 6 is a fragmentary sectional view similar to that of FIG. 1 but illustrating a radially enlarged peripheral die having a modified internal flow-directing bullet and a single row of peripheral die openings.

Referring now to FIG. 6, a second peripheral die 118 is depicted, mounted on the extruder 14 described previously. Broadly speaking, the die 18 differs from die 20 in that it is substantially radially enlarged and has on ly a single circumferently space die outlet openings 120. In more detail, the die 120 includes an initial tubular section 122 having a frustoconical input surface 124, a central flow-restricting opening 126, and a diverging output surface 128. Screws 130 are employed to secure the section 122 to the butt end of the extruder barrel as illustrated. Moreover, an annular metallic insert 132 is removably positioned within the opening 126.

An annular, generally L-shaped in cross-section segment 134 is threadably secured to the outboard end of section 120 and has the circumferentially spaced series of die outlet openings 120 therein. The segment 134 supports a central cross plate 136, the latter having an outwardly extending knife shaft 138. A flow-directing bullet 140 is secured to the inner face of cross plate 136 and extends outwardly to engage the adjacent inner surface of the segment 134. The bullet 140 has a central apex and an essentially uniform conical diverging surface 142. The surfaces 142 and 128 cooperatively define an elongated flow path 144 leading towards the openings 120 as shown. An advantage of the construction shown in FIG. 6 is that, with only a single series of die outlet openings 120, there is no problem of differential flow of material from axially spaced series of die outlet openings, which can result in extrudate pieces of varying lengths.

In typical operations employing extruders in accordance with the invention, an edible material to be processed is first formulated and then preconditioned, followed by passage into and through the short length extruder. In the preferred preconditioner, the material is moisturized and at least partially cooked. Preconditioning is normally carried out so that the product leaving the preconditioner has a total moisture content of from about 15–40% by weight, and more preferably from about 22–28% by weight. The residence time in the preconditioner is usually from about 15–150 seconds, and more preferably from about 90–150 seconds; and the maximum temperature in the preconditioner ranges from about 55–212° F., and more preferably from about 180–200° F.

During passage through the extruder, the material is subjected to increasing levels of temperature and shear and is normally fully cooked as it emerges from the extrusion die. Typical residence times of the material in the extruder barrel range from about 10–40 seconds, and more preferably from, about 20–30 seconds. Maximum pressure levels achieved in the extruder barrel are normally from about 150–1000 psi, and more preferably from about 300–500 psi. The maximum temperature level achieved in the extruder barrel is from about 220–300° F., and more preferably from about 230–250° F.

After leaving the extruder barrel, the material encounters the peripheral die assembly. In the preferred die assemblies described above, the material leaving the extruder barrel is first compressed and directed into and through the central flow-restricting opening, where upon the material passes outwardly through the flow path for ultimate extrusion through the die outlet openings. During such a process, it will be appreciated that the material is advanced in a direction transverse (normally essentially perpendicularly) to the longitudinal axis of the extruder barrel.

The extruders and methods in accordance with the invention are particularly suited for the preparation of feed products, especially animal feed products. Such products may be of the expanded variety, such as typical pet foods, or more dense pellet-type products typically fed to pigs. In such uses, the starting materials usually include a high proportion of grain at a level of at least about 40% by weight (e.g., corn, wheat, soy, milo, oats), and may include fats and other incidental ingredients. Expanded products in accordance with the invention would typically have a final (i.e., after drying) density of from about 15–25 kg/m$^3$, whereas denser pellet-type products would normally have a final density of from about 30–50 kg/m$^3$. Broadly, therefore, products of the invention would have final densities in the range of from about 15–50 kg/m$^3$. The products also have a relatively high Pellet Durability Index rating, normally above about 75, and more preferably above about 85.

Use of the peripheral die structure has been found to significantly increase the capacity of the extrusion assembly, as compared with prior machines of this character employing conventional face dies. Additionally, die manufacturer costs are considerably reduced because less expensive materials can be employed owning to the considerable hoop strength obtained through the use of a peripheral die arrangement. Although peripheral dies have been used in the past in connection with the processing of textured vegetable protein (TVP) products, they have not been employed in the context of short length, high speed extruders. Generally, when peripheral dies were used for the extrusion of TVP products, unsatisfactory low density extrudates were produced. However, it has been surprisingly found that use of peripheral dies in accordance with the present invention yields relatively high density products having very high pellet integrity.

For example, use of peripheral dies with the short length, high speed extruders of the type described in U.S. Pat. No. 5,694,833, as compared with use of conventional face dies, gives increased drive feed rates, higher moisture extrudates, greater degrees of cook, higher bulk densities and essentially equivalent or increased Pellet Durability Index values.

The following examples set forth preferred extrusion apparatus and methods in accordance with the invention. It is to be understood that the invention is not so limited and nothing in the examples should be taken as a limitation upon the overall scope of the invention.

The following examples set forth preferred apparatus and processing techniques in accordance with the invention. It is to be understood, however, that these examples are provided by way of illustration and nothing therein should be taken as a limitation upon the overall scope of the invention.

EXAMPLE

In this example, a short length extruder of the type described in U.S. Pat. No. 5,694,833 was equipped with a peripheral die and used to produce a feed product.

The extruder was of the type illustrated in FIG. 7 and consisted of three heads. In particular, the extruder was made up of the following components (were all parts are identified with Wenger Mfg. Co. Part Nos.): extruder barrel—68781-001, 68782-001, 68784-001; screw assembly—68792-001, 68793-001, 68805-023, 68796-001; final die—74002-219 NA, 74002-217 NA, 74002-218 NA, 31600-220 NA, 31600-621 BT. A rotating knife assembly was adjacent the outlet of the die for cutting the extrudate into a convenient size.

The overall assembly also included a Model 7 DDC preconditioner manufactured by Wenger Mfg. Inc. and generally described in U.S. Pat. No. 4,752,139 incorporated by reference herein. The preconditioner was mounted upstream of the extruder barrel inlet and served to moisten, mix and partially cook the dry ingredients before entry thereof into the extruder barrel. Specifically, the preconditioner employed a standard 390 configuration with 60 beaters mounted on each preconditioner shaft.

In the two test runs, the starting recipe was made up of 70.0% by weight corn, 18.0% by weight soy bean meal, 10.0% by weight wheat middlings, 1% by weight calcium carbonate, and 1.0% by weight salt.

The following table sets forth certain operating conditions for the preconditioner and the extrusion device in the two test runs; in general, the material is subjected to increasing levels of heat and shear during passage through the extruder and peripheral die.

TABLE 1

| | RUN #1 | RUN #2 |
|---|---|---|
| RAW MATERIAL INFORMATION: | | |
| Dry Recipe Moisture % wb | 12 | 12 |
| Dry Recipe Density kg/m$^3$ | 593 | 595 |
| Feed Screw Speed rpm | 85 | 111 |
| PRECONDITIONING INFORMATION | | |
| Preconditioner Speed rpm | | |
| Steam Flow to Preconditioner kg/hr | 80 | 80 |
| Preconditioner Discharge Temp ° C. | 80 | 80 |
| EXTRUSION INFORMATION: | | |
| Extruder Shaft Seed rpm | 1200 | 1200 |
| Motor Load % | — | 85 |
| Water Flow to Extruder kg/hr | 9.6 | — |
| FINAL PRODUCT INFORMATION: | | |
| Extruder Discharge Moisture % wb | 14 | 15.5 |
| Extruder Discharge Rate kg/hr | 1036 | 1409 |
| Extruder Discharge Density kg/m$^3$ | 577 | 593 |
| Extruder Performance | Stable | Stable |

After extrusion the product was conventionally dried to a level of below about 10% wet basis (Run No. 2 was analyzed and found to have a moisture content of 8.2% wb). The product from Run No. 2 was the best, and exhibited a Pellet Durability Index (PDI) of 95, contained 46.37% by weight total starch, 20.75% by weight gelatinized starch and had a 44.7% cook value. As used herein, "pellet durability index" and "PDI" refer to an art recognized durability test described in Feed Manufacturing Technology IV, American Feed Association, Inc., 1994, pages 121–122 (and referenced information), incorporated by reference herein. In such a durability test, the durability of pellets obtained immediately after cooling when the pellets have a temperature within ±10° F. of ambient temperature. Durability is determined by tumbling a 500 g sample of pre-sieved pellets (to remove fines) for 5 minutes at 50 rpm in a dust-tight 12"×12"×5" enclosure equipped with a 2"×9" internal plate affixed symmetrically along a 9" side to a diagonal of one 12"×12" dimension of the enclosure. The enclosure is rotated about an axis perpendicular to and centered on the 12" sides thereof. After tumbling, fines are removed by screening, and the pellet sample is reweighed. Pellet durability is defined as:

durability=weight of pellets after tumbling/weight of pellets before tumbling×100

We claim:

1. An extrusion device comprising:

an elongated tubular barrel having a material inlet and a spaced material outlet and presenting an inner surface defining an elongated bore;

an elongated, helically flighted screw assembly positioned within said bore;

a drive for axially rotating said screw assembly at a rotational speed of at least about 500 rpm; and a peripheral extrusion die assembly disposed across said material outlet and having a series of extrusion outlet openings oriented transverse to the longitudinal axis of said barrel, said die assembly comprising a first tubular section adjacent said material outlet and presenting a converging input wall, a restricted through opening, and a diverging output wall downstream of said input wall and opening, said opening having a diameter less than the diameter of said barrel, flow-directing structure spaced downstream of said output wall and having a diverging outer surface, and annular die plate disposed about said flow-directing structure and having said outlet openings therethrough.

2. The device of claim 1, said die presenting a plurality of series of said extrusion outlet openings, with the respective series thereof being axially spaced.

3. The device of claim 1, said extruder having L/D ratio of up to about 7.

4. The device of claim 3, said ratio being up to about 6.

5. The device of claim 4, said ratio being from about 3–6.

6. The device of claim 1, said bore being of generally frustoconical configuration for at least about 50% of the length of the bore from said inlet to said outlet.

7. The device of claim 6, said bore being of generally frustoconical configuration from said inlet to said outlet to present a generally decreasing cross-sectional area along the length of the bore.

8. The device of claim 1, said screw assembly comprising a single elongated, axially flighted screw within said barrel.

9. The device of claim 1, said peripheral die having a diameter substantially greater than the diameter of said barrel at said outlet end, with said openings located radially outwardly from said barrel.

10. The device of claim 1, said drive operable for rotating said screw assembly at a rotational speed of about 600–1500 rpm.

11. The device of claim 1, said inner bore-defining surface of said barrel presenting a series of spaced, helical rib sections along the length thereof.

12. A method of extrusion cooking comprising the steps of:

passing an extrudable mixture into the inlet of an elongated extruder having a barrel equipped with an outlet and an endmost peripheral extrusion die on said barrel at said outlet, and an internal, axially rotatable, flighted screw assembly within the barrel; and rotating said screw assembly at a speed of *at least* about 500 rpm for advancing material from said inlet along the length of said barrel and out said outlet and through said peripheral extension die, said rotating and advancing step including the steps of first passing said material generally axially out said barrel outlet, then causing the material to converge downstream from said outlet and pass through a restricted opening, thereafter causing the material to diverge downstream from said restricted opening, and finally causing the material to pass from said peripheral die in a direction transverse to the longitudinal axis of said barrel.

13. The method of claim 12, including the step of passing said material through a plurality of series of extrusion outlet openings provided in said peripheral extrusion die, with the respective series thereof being axially spaced.

14. The method of claim 12, said extruder having L/D ratio of up to about 7.

15. The method of claim 14, said ratio being up to about 6.

16. The method of claim 15, said ratio being from about 3–6.

17. The method of claim 12, including the step of rotating of said screw assembly at a rotational speed of about 600–1500 rpm.

* * * * *